United States Patent
Poulis et al.

(10) Patent No.: US 12,485,838 B2
(45) Date of Patent: Dec. 2, 2025

(54) POWER DISTRIBUTION UNIT FOR AUTONOMOUS VEHICLES

(71) Applicant: TUSIMPLE, INC., San Diego, CA (US)

(72) Inventors: Spiros Poulis, Tucson, AZ (US); Holden James Yildirim, Tucson, AZ (US); Jade E. Day, Tucson, AZ (US); Faez Yahya, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 210 days.

(21) Appl. No.: 18/358,748

(22) Filed: Jul. 25, 2023

(65) Prior Publication Data

US 2024/0034253 A1 Feb. 1, 2024

Related U.S. Application Data

(60) Provisional application No. 63/369,712, filed on Jul. 28, 2022.

(51) Int. Cl.
*B60R 16/023* (2006.01)
*B60R 16/03* (2006.01)

(52) U.S. Cl.
CPC .......... *B60R 16/0238* (2013.01); *B60R 16/03* (2013.01)

(58) Field of Classification Search
CPC ............................. B60R 16/0238; B60R 16/03
See application file for complete search history.

(56) References Cited

U.S. PATENT DOCUMENTS

| | | |
|---|---|---|
| 11,203,262 B2 | 12/2021 | Schumacher et al. |
| 2005/0127747 A1* | 6/2005 | Robertson ................. B60T 7/20 303/20 |
| 2013/0050880 A1* | 2/2013 | Rozman ................. H02H 3/025 361/18 |
| 2015/0021994 A1 | 1/2015 | Bojarski et al. |
| 2017/0041764 A1* | 2/2017 | Nizgoda ................. H04W 4/40 |
| 2017/0282819 A1 | 10/2017 | Emrani |
| 2020/0223383 A1 | 7/2020 | Awad Alla et al. |
| 2021/0009007 A1* | 1/2021 | Day ........................ B60L 58/20 |
| 2021/0164408 A1* | 6/2021 | Gysi ................... F02D 19/0647 |
| 2022/0063414 A1 | 3/2022 | Kim et al. |

FOREIGN PATENT DOCUMENTS

WO 2021178989 A1 9/2021

OTHER PUBLICATIONS

European Patent Office, European Extended Search Report for EP Appl. No. 23188247.3, generated on Jan. 4, 2024, 10 pages.

* cited by examiner

*Primary Examiner* — Scott Bauer
(74) *Attorney, Agent, or Firm* — Perkins Coie LLP

(57) ABSTRACT

Devices, systems, and methods for power distribution in autonomous vehicles are described. An example method of power distribution includes receiving, by a controller disposed in a vehicle, an indication of a fault associated with a load unit of a plurality of load units, wherein the load unit is communicatively coupled to an associated solid-state semiconductor switch, disconnecting, in response to the receiving the indication of the fault, the associated solid-state semiconductor switch, and transmitting, using a controller area network bus in the vehicle communicatively coupled the controller, a digital data message indicative of disconnecting the associated solid-state semiconductor switch to a vehicle control unit.

18 Claims, 5 Drawing Sheets

POWER DISTRIBUTION UNIT FOR AUTONOMOUS VEHICLES

CROSS-REFERENCE TO RELATED APPLICATIONS

This patent document claims priority to and the benefit of U.S. Provisional Application No. 63/369,712, filed on Jul. 28, 2022. The aforementioned application of which is incorporated by reference herein in its entirety.

TECHNICAL FIELD

This document generally relates to controlling vehicles, and in particular, to power distribution units for autonomous vehicles.

BACKGROUND

Autonomous vehicle navigation is a technology for sensing the position and movement of a vehicle and based on the sensing, autonomously control the vehicle to navigate towards a destination. Autonomous vehicle control and navigation can have important applications in transportation of people, goods, and services. Efficient control and navigation in autonomous vehicles relies on a robust power distribution unit, which is typically configured to receive electrical power from a power source in the vehicle and provide that electrical power to one or more devices on or in the vehicle. A reliable power distribution unit is paramount for the safety of the vehicle and its passengers, as well as people and property in the vicinity of the vehicle, and for the operating efficiency of driving missions.

SUMMARY

Devices, systems, and methods for power distribution in autonomous vehicles are described. In an example, this is achieved by using a power distribution unit (PDU) to individually control, power condition, and diagnose a plurality of load units, each of the load units being coupled to an associated solid-state semiconductor switch. The PDU is configured to detect fault conditions based on at least measurements of each load unit's voltage and current, and measurements of the main battery's voltage.

In yet another aspect, the methods described in this document are embodied in the form of processor-executable code and stored in a computer-readable program medium.

In yet another aspect, a device that is configured or operable to perform the methods described in this document is disclosed. The device may include a processor that is programmed to implement this method.

The above and other aspects and features of the disclosed technology are described in greater detail in the drawings, the description, and the claims.

DETAILED DESCRIPTION

The transportation industry has been undergoing considerable changes in the way technology is used to control the operation of vehicles. As exemplified in the automotive passenger vehicle, there has been a general advancement towards shifting more of the operational and navigational decision making away from the human driver and into on-board computing power. This is exemplified in the extreme by the numerous under-development autonomous vehicles. Current implementations are in intermediate stages, such as the partially-autonomous operation in some vehicles (e.g., autonomous acceleration and navigation, but with the requirement of a present and attentive driver), the safety-protecting operation of some vehicles (e.g., maintaining a safe following distance and automatic braking), the safety-protecting warnings of some vehicles (e.g., blind-spot indicators in side-view mirrors and proximity sensors), as well as ease-of-use operations (e.g., autonomous parallel parking).

Different types of autonomous vehicles have been classified into different levels of automation under the Society of Automotive Engineers' (SAE) J3016 standard, which ranges from Level 0 in which the vehicle has no automation to Level 5 (L5) in which the vehicle has full autonomy. In an example, SAE Level 4 (L4) is characterized by the vehicle operating without human input or oversight but only under select conditions defined by factors such as road type or geographic area. In order to achieve SAE L4 autonomy, a robust and reliable power distribution unit (PDU) is a necessity.

A reliable and redundant PDU architecture is both essential and critical in achieving safety and reliability in autonomous vehicles regardless of their level of autonomy, but especially for Level 4 (L4) autonomous systems as defined in SAE J3016, in which the automation is configured to operate without human intervention under specific conditions, when all of the conditions are met, but wherein a human still has an option to override the autonomous driving system. For L4 systems, the PDU must exhibit a level of robustness that enables it to handle any kind of failure to ensure the safety of the autonomous vehicle and both persons and property in the area surrounding the vehicle.

Figure 1:
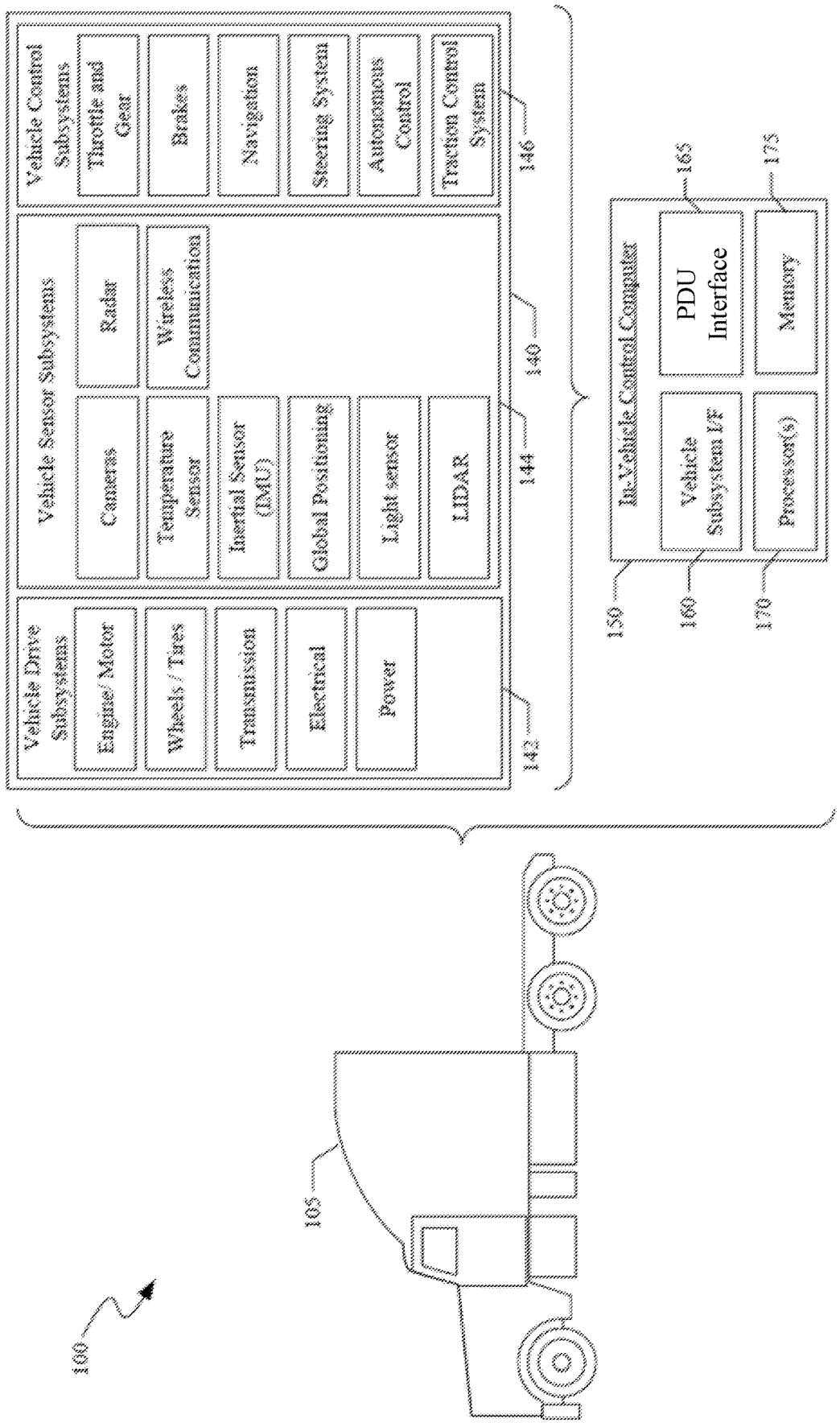
FIG. 1 shows a block diagram of an example vehicle ecosystem in which an in-vehicle control computer located in the vehicle comprises an interface to a power distribution unit (PDU) in the vehicle.

FIG. 1 shows a block diagram of an example vehicle ecosystem 100 in which an in-vehicle control computer 150 located in the autonomous vehicle 105 includes an interface to the power distribution unit of the vehicle. As shown in FIG. 1, the autonomous vehicle 105 may be a semi-trailer truck. The vehicle ecosystem 100 includes several systems and components that can generate and/or deliver one or more sources of information/data and related services to the in-vehicle control computer 150 that may be located in an autonomous vehicle 105. The in-vehicle control computer 150 can be in data communication with a plurality of vehicle subsystems 140, all of which can be resident in the autonomous vehicle 105. The in-vehicle computer 150 and the plurality of vehicle subsystems 140 can be referred to as autonomous driving system (ADS). A vehicle subsystem interface 160 is provided to facilitate data communication between the in-vehicle control computer 150 and the plurality of vehicle subsystems 140. In some embodiments, the vehicle subsystem interface 160 can include a controller area network controller to communicate with devices in the vehicle subsystems 140.

The autonomous vehicle 105 may include various vehicle subsystems that support the operation of autonomous vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems or one or more components or devices can be removed. The vehicle drive subsystem 142 may include components operable to provide powered motion for the autonomous vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment in which the autonomous vehicle 105 is operating or a condition of the autonomous vehicle 105. The vehicle sensor subsystem 144 may include one or more cameras or image capture devices, one or more temperature sensors, an inertial measurement unit (IMU), a Global Positioning System (GPS) device, a laser range finder/LiDAR unit, a RADAR unit, and/or a wireless communication unit (e.g., a cellular communication transceiver). The vehicle sensor subsystem 144 may also include sensors configured to monitor internal systems of the autonomous vehicle 105 (e.g., an O2 monitor, a fuel gauge, an engine oil temperature, etc.). In some embodiments, the vehicle sensor subsystem 144 may include sensors in addition to the sensors shown in FIG. 1.

The IMU may include any combination of sensors (e.g., accelerometers and gyroscopes) configured to sense position and orientation changes of the autonomous vehicle 105 based on inertial acceleration. The GPS device may be any sensor configured to estimate a geographic location of the autonomous vehicle 105. For this purpose, the GPS device may include a receiver/transmitter operable to provide information regarding the position of the autonomous vehicle 105 with respect to the Earth. The RADAR unit may represent a system that utilizes radio signals to sense objects within the environment in which the autonomous vehicle 105 is operating. In some embodiments, in addition to sensing the objects, the RADAR unit may additionally be configured to sense the speed and the heading of the objects proximate to the autonomous vehicle 105. The laser range finder or LiDAR unit may be any sensor configured to use lasers to sense/detect objects in the environment in which the autonomous vehicle 105 is located. The LiDAR unit may be a spinning LiDAR unit or a solid-state LiDAR unit. The cameras may include one or more cameras configured to capture a plurality of images of the environment of the autonomous vehicle 105. The cameras may be still image cameras or motion video cameras.

The vehicle control subsystem 146 may be configured to control operation of the autonomous vehicle 105 and its components. Accordingly, the vehicle control subsystem 146 may include various elements such as a throttle and gear, a brake unit, a navigation unit, a steering system and/or an autonomous control unit. The throttle may be configured to control, for instance, the operating speed of the engine and, in turn, control the speed of the autonomous vehicle 105. The gear may be configured to control the gear selection of the transmission. The brake unit can include any combination of mechanisms configured to decelerate the autonomous vehicle 105. The brake unit can use friction to slow the wheels in a standard manner. The brake unit may include an anti-lock brake system (ABS) that can prevent the brakes from locking up when the brakes are applied. Additionally, the brake unit may include an engine braking system. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more predetermined maps so as to determine the driving path for the autonomous vehicle 105. The steering system may represent any combination of mechanisms that may be operable to adjust the heading of autonomous vehicle 105 in an autonomous mode or in a driver-controlled mode.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the GPS device, the RADAR, the LiDAR, the cameras, and/or other vehicle subsystems to determine the driving path or trajectory for the autonomous vehicle 105.

The traction control system (TCS) may represent a control system configured to prevent the autonomous vehicle 105 from swerving or losing control while on the road. For example, TCS may obtain signals from the IMU and the engine torque value to determine whether it should intervene and send instructions to one or more brakes on the autonomous vehicle 105 to mitigate the autonomous vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the autonomous vehicle 105 can be controlled by the in-vehicle control computer 150. The in-vehicle control computer 150 may include at least one processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the autonomous vehicle 105 in a distributed fashion. In some embodiments, the memory 175 may contain processing instructions (e.g., program logic) executable by the processor 170 to perform various methods and/or functions of the autonomous vehicle 105, including those described for the power distribution unit (PDU), whose interface 165 is part of the in-vehicle control computer 150, as explained in this document. For instance, the processor 170 executes the operations associated with PDU via PDU interface 165. The operations of the PDU are further described in this document.

The memory 175 may contain additional instructions as well, including instructions to transmit data to, receive data from, interact with, or control one or more of the vehicle drive subsystems 142, the vehicle sensor subsystem 144, and the vehicle control subsystem 146. The in-vehicle control computer 150 may control the function of the autonomous vehicle 105 based on inputs received from various vehicle subsystems (e.g., the vehicle drive subsystem 142, the vehicle sensor subsystem 144, and the vehicle control subsystem 146).

In some embodiments, the described methods, devices, and systems are directed to SAE L4 autonomous driving dynamic control systems, which cover SAE L1-L3 driving assistance applications, semi-autonomous systems, and expand to the full coverage of vehicle dynamic control needs in real-world driving, which includes lane changes, merging into traffic, navigating highway on/off ramps, passing through intersections, maneuvering through congested traffic, parking, and docking operations, etc. In contrast to conventional systems that focus on a single control target, embodiments of the disclosed technology are part of the processing of a control mission that involves control targets defined in multiple dimensions and which are typically time varying.

Embodiments of the disclosed technology provide methods and systems for power distribution in autonomous vehicles. The PDUs of the described embodiments advantageously provide independent control, power conditioning, and diagnostics for each of the load units in the autonomous vehicle that are connected to the respective PDU.

In existing implementations, power distribution units are typically passive PDUs that are communicatively coupled to current sensors that cannot be turned off/on by demand. Furthermore, a passive PDU is typically configured to only react to anomalous behavior, e.g., the detection of an overcurrent by a passive PDU results in the corresponding circuit breaker or fuse tripping. In contrast, the described embodiments include a smart PDU that can be configured to independently control, power condition, and diagnose each of the load units connected thereto. For example, the smart PDU can continually monitor characteristics (e.g., current and voltage) of the connected load units and determine whether a respective switch should be disconnected in anticipation of an overcurrent (as compared to in response to it).

Figure 2A:
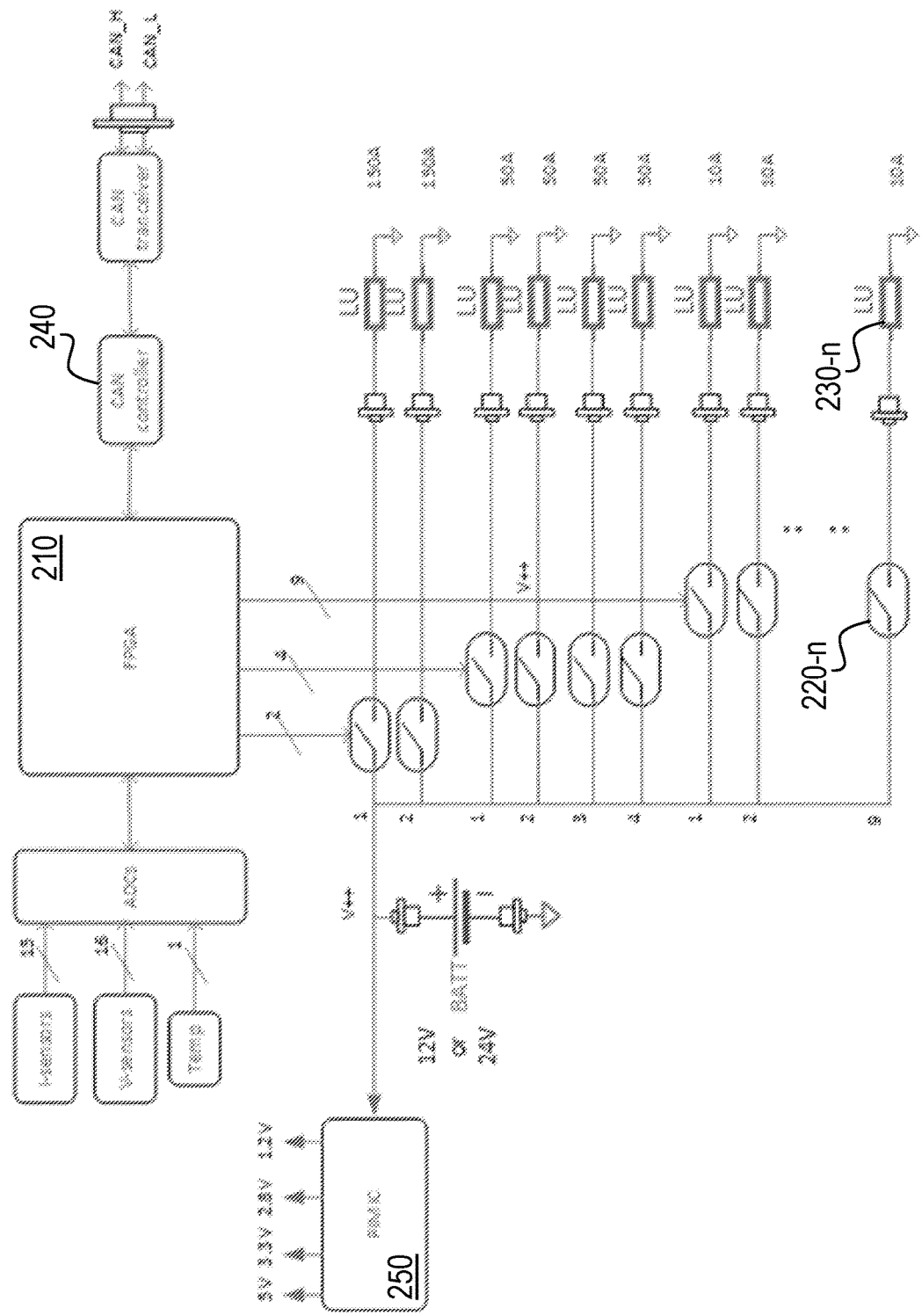
FIG. 2A shows a block diagram of an example power distribution unit.

In some embodiments, and as shown in FIG. 2A, a PDU includes an input connector configured to receive electrical power from a power source in the vehicle (e.g., the 12V or 24V battery shown in FIG. 2A) and one or more output connectors configured to provide electrical power to one or more devices on or in the vehicle (e.g., the load units including load unit (LU) 230-n). In an example, each of the load units is associated with a temperature sensor, one or more voltage sensors associated with the one or more output connectors, and one or more current sensors associated with the one or more output connectors. A controller (e.g., a field-programmable gate array (FPGA) 210 in FIG. 2A) is communicatively coupled to the other components of the PDU, and provides interfaces to control the on/off status of the switches, the analog-to-digital converter (ADC) associated with the sensors, and the controller area network (CAN) controller 240 and CAN transceiver. The PDU further includes a power integrated module (PIM) integrated circuit (IC) 250, which is communicatively coupled to the other components of the PDU as shown in FIG. 2A, and provides multiple regulated voltages to the controller, the on-board sensors, and the amplifier circuitry.

Figure 2B:
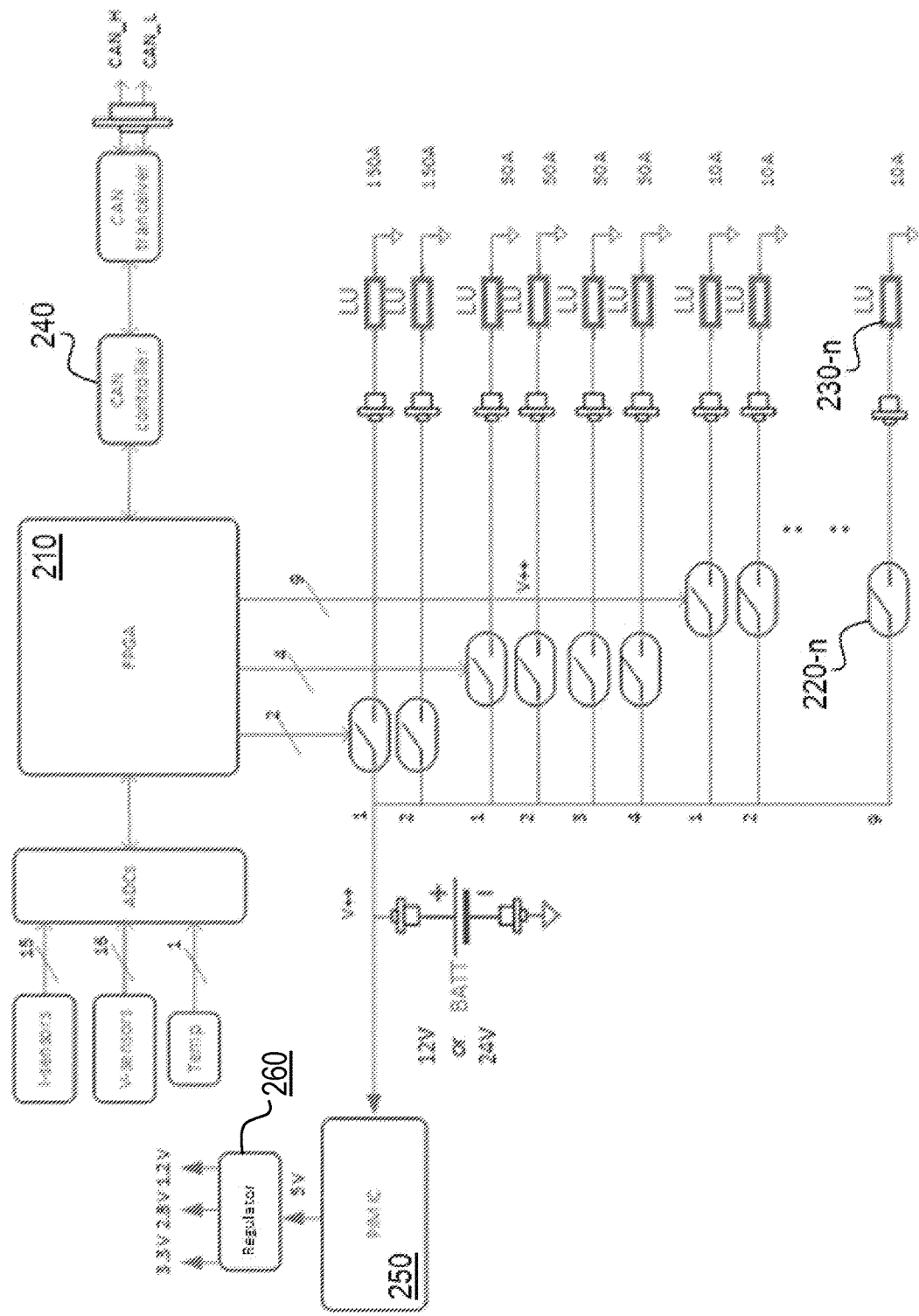
FIG. 2B shows a block diagram of another example power distribution unit.

In some embodiments, and as shown in FIG. 2B, the PIM IC 250, which is communicatively coupled to the other components of the PDU, generates a single voltage of 5V. Afterwards, voltage regulators such as linear regulators or low drop out (LDO) regulators, e.g., regulator 260, can be used to regulate and maintain voltages at desired levels (e.g., 1.2V, 3.3V, 7.5V) for the other components of the PDU.

In some embodiments, the ADC is a 12-bit ADC that is used for data acquisition from the current, voltage, and temperature sensors. In an example, a PDU can be configured with a total of 32 ADC channels; 15 channels for voltage, 15 channels for current, 1 channel for the main battery voltage, and 1 channel for PCB ambient temperature.

In some embodiments, the switches in the PDU shown in FIG. 2A are metal-oxide-semiconductor field-effect transistor (MOSFET) type relays or any other type of a controllable electrical switch, which provide better and more stable control, as well as an increased longevity, as compared to mechanical switches that are typically used in existing PDU implementations.

As shown in the example in FIG. 2A, the PDU provides switched power to fifteen load units that are arranged as (1) two 150 A load units, (2) four 50 A load units, and (3) nine 10 A load units. As described above, the PDU includes a controller, e.g., FPGA 210, that controls all the processes and functions of the PDU. For example, the controller acquires measurements for each load unit's voltage and current, as well as measurements for the main battery's voltage and measurements of the ambient temperature of the printed circuit boards (PCBs) in the PDU. The controller is further configured to perform bi-directional communication with a power bridge (not shown in FIG. 2A) using the CAN controller 240 and CAN transceiver. In an example, the CAN controller and CAN transceiver are implemented as a CAN flexible data-rate (CAN-FD) controller and CAN-FD transceiver, respectively.

In some embodiments, the controller is configured to use the measurements, e.g., from the load units, main battery, and PCBs, to detect and process fault conditions associated with one or more of the load units, main battery, and/or PCBs. The controller is further configured to report the status of the PDU to the power bridge and accept commands from the power bridge. In an example, the controller may disconnect a particular switch based on the measurements associated with the corresponding load unit. Alternatively, the controller can receive a message from the power bridge to disconnect a particular switch (irrespective of the measurements received from that load unit). In an example, the fault conditions that can be detected and processed include overcurrent, overvoltage, undervoltage, and a PCB ambient temperature outside a normal range, e.g., −40° C. to +85° C.

As the automotive industry continues to develop, a need to consider capabilities of new technology in terms of survivability against commonly encountered transient voltage events (e.g., electrical disturbances from conduction and coupling) is apparent. The PDU, as well as the load units connected to the PDU, may encounter the transient voltage events if proper control circuitry is not implemented. The transient voltage events can range from severe, high-energy transients generated by an alternator/regulator system to low-level noise generated by an ignition system. In some embodiments, the PDU includes a protective circuitry (not shown in FIG. 2A or 2B) in order to protect both the PDU and the connected load units from the transient voltage events. These transient voltage events may include those described in the International Organization for Standardization (ISO) 7637-2 specification. The same circuitry may protect against a load dump transient event as described in the ISO 16750-2 specification.

In some embodiments, each of the channels connected to a respective current sensor for each of the load units can be configured with a distinct current limiting capability, and if this current limit is exceeded, a fault is declared. Furthermore, the PDU can be configured such that the short circuit protection is implemented independently from the programmable current limit, which advantageously increases the flexibility of the described embodiments. In an example, the limit on the input current can be configured to be as high as 250 A.

In some embodiments, the described PDUs support an input voltage range of 9V to 36V for either 12V or 24V power supplies. In an example, the described PDUs can support 5000 W to 6000 W (with a maximum of 7000 W having been tested).

Embodiments of the disclosed technology provide, inter alia, the following features, benefits, and advantages:

Including semiconductor-based switches for individually disconnecting power to one or more load units (independently of each other);

Providing power to multiple load units, e.g., two units with current in the range of 100 A to 200 A, four units with current in the range of 25 A to 75 A, and nine units with current in the range of 5 A to 15 A (e.g., as shown in FIG. 2A);

Detecting fault conditions based on (1) measurements from each load unit's voltage and current sensors, (2) measurements of the main battery's voltage sensor, and (3) measurements from the PCB's ambient temperature sensor, and wherein the fault conditions include overcurrent, overvoltage, undervoltage, and the PCB ambient temperature being outside the normal range;

Enabling bi-directional communication with a power bridge, which includes transmitting the PDU status and receiving control commands, e.g., to support load control via power switches by commands from the PBR; and Including a controller (e.g., an FPGA or a microcontroller) that provides interfaces to control the on/off status of the switches and to the CAN bus.

Embodiments of the disclosed technology provide a system for power distribution that includes a controller communicatively coupled to a plurality of sensors and a controller area network (CAN) bus of a vehicle, a plurality of load units coupled to the CAN bus, a power source, and a plurality of solid-state semiconductor switches, wherein each of the plurality of solid-state semiconductor switches is communicatively coupled to the power source, the controller, and an associated load unit of the plurality of load units, wherein the controller is configured to, in response to a status of the associated load unit, turn a corresponding solid-state semiconductor switch on or off, wherein the plurality of sensors is configured to monitor the status of the associated load unit, and wherein the plurality of sensors comprising at least a current sensor, a voltage sensor, and a temperature sensor.

In some embodiments, each of the plurality of solid-state semiconductor switches comprises a metal-oxide-semiconductor field-effect transistor (MOSFET).

In some embodiments, the controller is configured to control, based on the plurality of sensors, an associated circuit breaker for each of the plurality of load units.

In some embodiments, the controller is configured, as part of controlling the associated circuit breaker for a corresponding load unit, to disconnect the associated circuit breaker in response to either a current, a voltage, or a temperature associated with the corresponding load unit exceeding a programmable threshold, and transmit, via the CAN bus, a message indicative of disconnecting the associated circuit breaker to a vehicle control unit.

In some embodiments, the controller is configured to communicate with a power bridge via the CAN bus.

In some embodiments, the controller is configured to control an associated circuit breaker for each of the plurality of load units based on commands received from the power bridge.

In some embodiments, the power source is a 12V power source. In some embodiments, the controller is configured to switch to a 24V power source from the 12V power source. In some embodiments, the controller supports a 9V to 36V input voltage range.

In some embodiments, the controller is further configured to limit a current through each of the plurality of load units.

In some embodiments, a maximum limit for the current can be configured to be between 200 to 300 Amperes.

In some embodiments, the controller is further configured to perform power conditioning operations that include smoothing a sinusoidal alternating current waveform, maintaining a constant voltage in response to varying loads, and damping effects of transient current spikes and voltage spikes.

In some embodiments, the system further includes electromagnetic interference (EMI) suppression circuitry coupled to the controller and the plurality of solid-state semiconductor switches.

In some embodiments, the controller is a microcontroller.

In some embodiments, the controller is a field-programmable gate array (FPGA).

Figure 3:
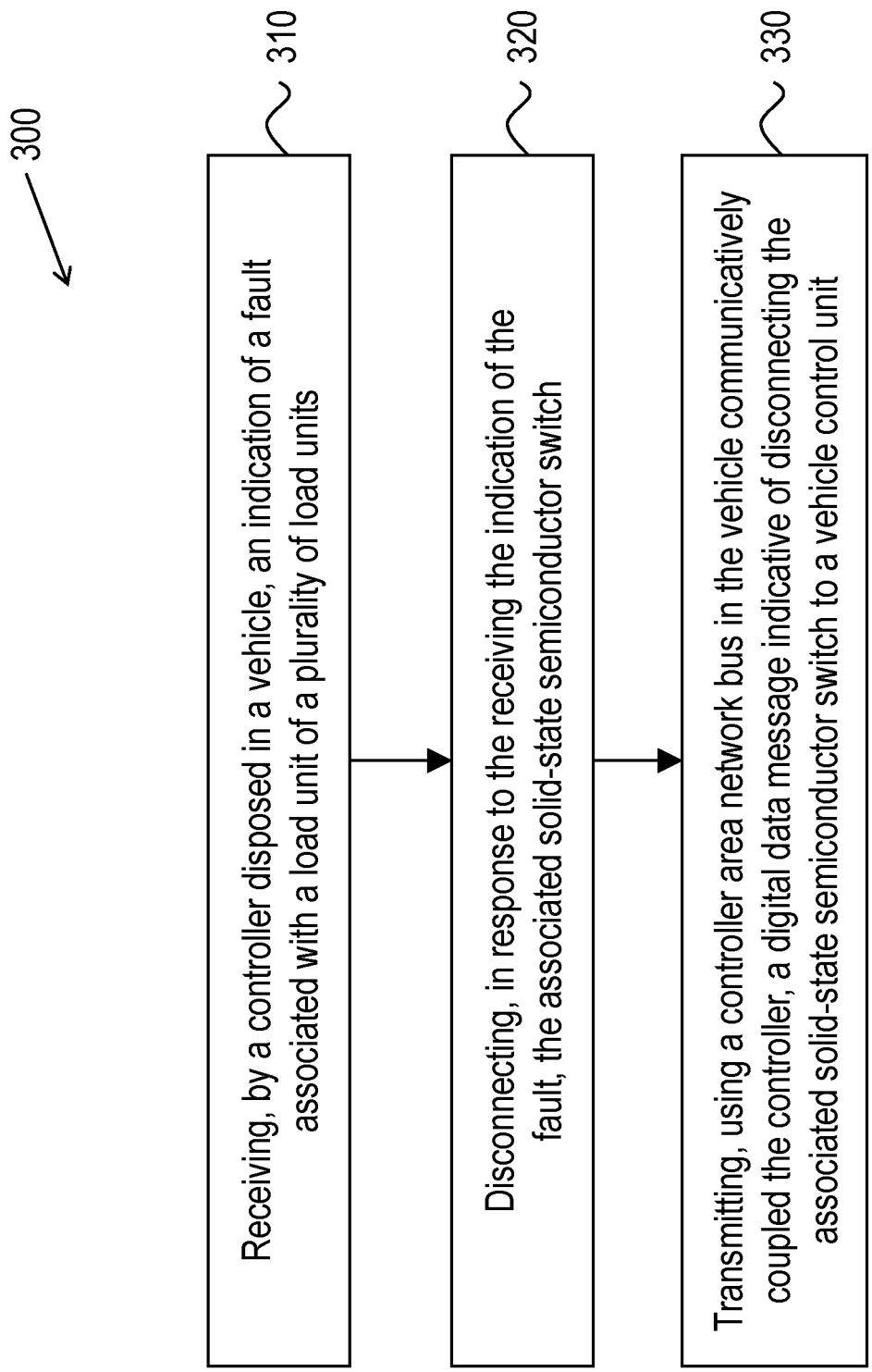
FIG. 3 shows a flowchart for an example method for power distribution.

FIG. 3 shows a flowchart for an example method 300 of power distribution. The method 300 includes, at operation 310, receiving, by a controller disposed in a vehicle, an indication of a fault associated with a load unit of a plurality of load units. In some embodiments, the load unit is communicatively coupled to an associated solid-state semiconductor switch.

The method 300 includes, at operation 320, disconnecting, in response to the receiving the indication of the fault, the associated solid-state semiconductor switch.

The method 300 includes, at operation 330, transmitting, using a controller area network (CAN) bus in the vehicle communicatively coupled to the controller, a digital data message indicative of disconnecting the associated solid-state semiconductor switch to a vehicle control unit (VCU).

In some embodiments, the indication of the fault is received from a plurality of sensors associated with the load unit, and the plurality of sensors comprises a current sensor, a voltage sensor, and a temperature sensor (e.g., as shown in FIG. 2A).

In some embodiments, the indication of the fault is received from a power bridge that is communicatively coupled to the controller via the CAN bus. In an example, the CAN bus is a CAN-FD bus.

In some embodiments, the associated solid-state semiconductor switch is a metal-oxide-semiconductor field-effect transistor (MOSFET).

In some embodiments, the method 300 further includes the operation of performing power conditioning operations that include smoothing a sinusoidal alternating current waveform, maintaining a constant voltage in response to varying loads, and damping effects of transient current spikes and voltage spikes.

In some embodiments, the controller is a microcontroller.

In some embodiments, the controller is a field-programmable gate array (FPGA).

In the embodiments discussed above, the vehicle is an autonomous vehicle operating in a Society of Automotive Engineers (SAE) Level 4 (L4) automation mode.

Figure 4:
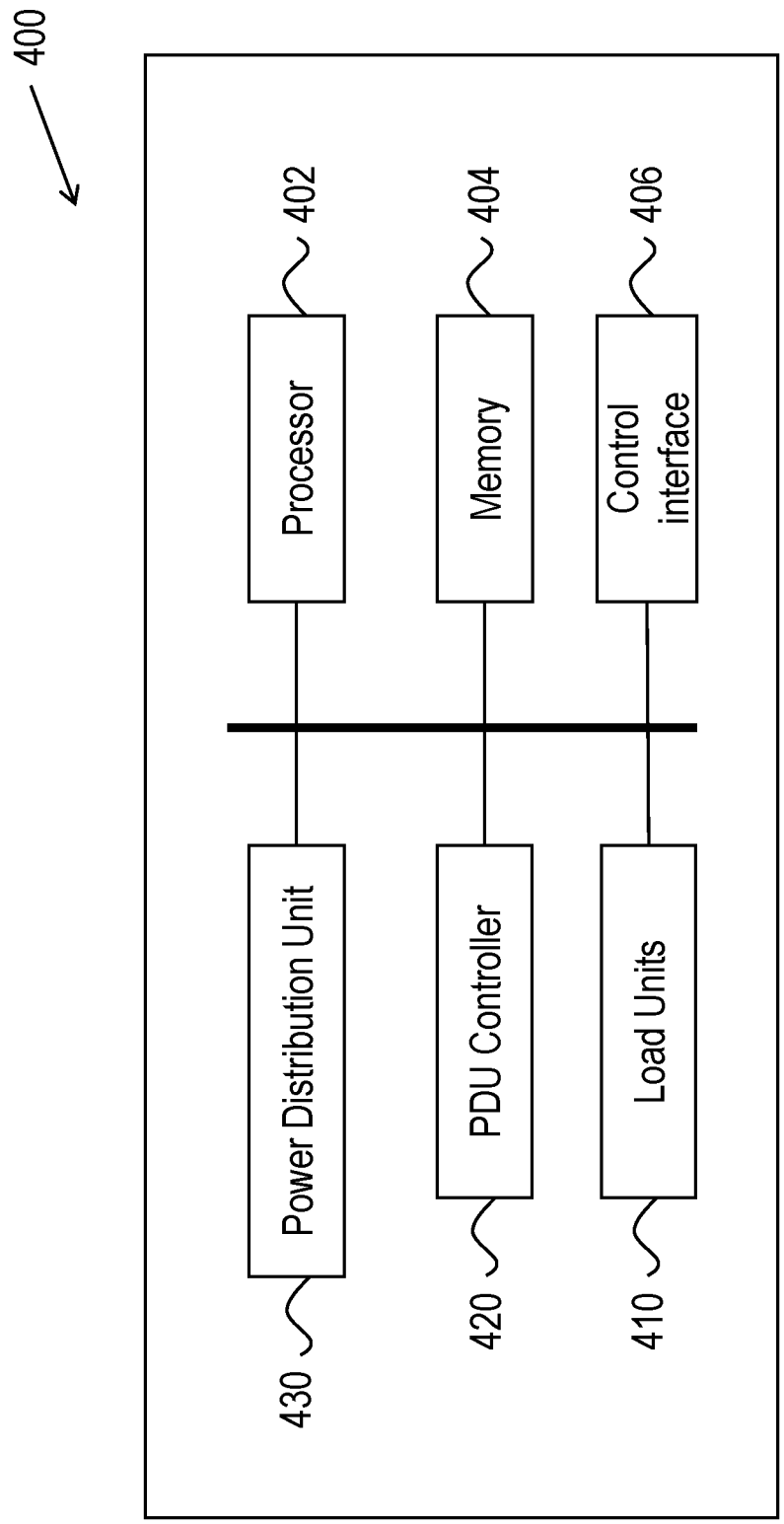
FIG. 4 shows an example of a hardware platform that can implement some methods and techniques described in the present document.

FIG. 4 shows an example of a hardware platform 400 that can be used to implement some of the techniques described in the present document. For example, the hardware platform 400 may implement method 400 or may implement the various modules described herein. The hardware platform 400 may include a processor 402 that can execute code to implement a method. The hardware platform 400 may include a memory 404 that may be used to store processor-executable code and/or store data. The hardware platform 400 may further include a control interface 406. For example, the control interface 406 may implement one or more intra-vehicular communication protocols. The hardware platform may further include one or more load units 410, a power distribution unit (PDU) 430, and a PDU controller 420, e.g., an FPGA or a microcontroller. In some embodiments, some portion or all of the PDU controller 420 may be implemented in the processor 402. In other embodiments, the memory 404 may comprise multiple memories, some of which are exclusively used by the PDU FPGA 420.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media, and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A system for power distribution, comprising:
a controller communicatively coupled to a plurality of sensors and a controller area network (CAN) bus of a vehicle;
a plurality of load units coupled to the CAN bus;
a power source; and
a plurality of solid-state semiconductor switches,
wherein each of the plurality of solid-state semiconductor switches is communicatively coupled to the power source, the controller, and an associated load unit of the plurality of load units, wherein the controller is configured to, in response to a status of the associated load unit, turn a corresponding solid-state semiconductor switch on or off, wherein the plurality of sensors is configured to monitor the status of the associated load unit, wherein the plurality of sensors comprising at least one of a current sensor, a voltage sensor, or a temperature sensor, wherein the controller is configured to communicate with a power bridge via the CAN bus, and wherein the controller is configured to control an associated circuit breaker for each of the plurality of load units based on commands received from the power bridge.

2. The system of claim 1, wherein each of the plurality of solid-state semiconductor switches comprises a metal-oxide-semiconductor field-effect transistor (MOSFET).

3. The system of claim 2, wherein the controller is configured to control, based on the plurality of sensors, an associated circuit breaker for each of the plurality of load units.

4. The system of claim 3, wherein the controller is configured, as part of controlling the associated circuit breaker for a corresponding load unit, to:

disconnect the associated circuit breaker in response to at least one of a current, a voltage, or a temperature associated with the corresponding load unit exceeding a programmable threshold; and transmit, via the CAN bus, a message indicative of disconnecting the associated circuit breaker to a vehicle control unit (VCU).

5. The system of claim 1, wherein the power source is a 12V power source.

6. The system of claim 5, wherein the controller is configured to switch to a 24V power source from the 12V power source.

7. The system of claim 1, wherein the controller supports an input voltage range that spans from 9V to 36V.

8. The system of claim 1, wherein the controller is further configured to limit a current through each of the plurality of load units.

9. The system of claim 8, wherein a maximum limit for the current is between 250 Amperes and 300 Amperes.

10. The system of claim 1, wherein the controller is further configured to perform power conditioning operations that include smoothing a sinusoidal alternating current waveform, maintaining a constant voltage in response to varying loads, and damping effects of transient current spikes and voltage spikes.

11. The system of claim 1, further comprising:
electromagnetic interference (EMI) suppression circuitry coupled to the controller and the plurality of solid-state semiconductor switches.

12. The system of claim 1, wherein the controller is a microcontroller.

13. The system of claim 1, wherein the controller is a field-programmable gate array (FPGA).

14. The system of claim 1, wherein the vehicle is an autonomous vehicle operating in a Society of Automotive Engineers (SAE) Level 4 (L4) automation mode.

15. A method of power distribution, comprising:

receiving, by a controller disposed in a vehicle, an indication of a fault associated with a load unit of a plurality of load units, wherein the load unit is communicatively coupled to an associated solid-state semiconductor switch;

disconnecting, in response to the receiving the indication of the fault, the associated solid-state semiconductor switch; and transmitting, using a controller area network (CAN) bus in the vehicle communicatively coupled the controller, a digital data message indicative of disconnecting the associated solid-state semiconductor switch to a vehicle control unit (VCU).

16. The method of claim 15, wherein the indication of the fault is received from a plurality of sensors associated with the load unit, and wherein the plurality of sensors comprises at least one of a current sensor, a voltage sensor, or a temperature sensor.

17. The method of claim 15, wherein the indication of the fault is received from a power bridge that is communicatively coupled to the controller via the CAN bus.

18. A non-transitory computer readable medium storing executable instructions for an autonomous driving vehicle that, when executed by at least one processor, cause the at least one processor to perform at least the following:

receive, by a controller disposed in the autonomous driving vehicle, an indication of a fault associated with a load unit of a plurality of load units, wherein the load unit is communicatively coupled to an associated solid-state semiconductor switch;

disconnect, in response to the receiving the indication of the fault, the associated solid-state semiconductor switch; and transmit, using a controller area network (CAN) bus in the autonomous driving vehicle communicatively coupled the controller, a digital data message indicative of disconnecting the associated solid-state semiconductor switch to a vehicle control unit (VCU).

* * * * *